United States Patent
Takahara

(10) Patent No.: US 9,819,918 B2
(45) Date of Patent: Nov. 14, 2017

(54) COLOR SEPARATING AND COMBINING PRISM AND PROJECTOR USING SAME

(71) Applicant: Konica Minolta, Inc., Tokyo (JP)

(72) Inventor: Koji Takahara, Hirakata (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/100,449

(22) PCT Filed: Sep. 17, 2014

(86) PCT No.: PCT/JP2014/074476
§ 371 (c)(1),
(2) Date: May 31, 2016

(87) PCT Pub. No.: WO2015/083413
PCT Pub. Date: Jun. 11, 2015

(65) Prior Publication Data
US 2016/0309126 A1 Oct. 20, 2016

(30) Foreign Application Priority Data

Dec. 5, 2013 (JP) ................................. 2013-252229

(51) Int. Cl.
*H04N 9/31* (2006.01)
*G02B 27/10* (2006.01)
(Continued)

(52) U.S. Cl.
CPC ....... *H04N 9/3158* (2013.01); *G02B 27/1026* (2013.01); *G02B 27/141* (2013.01);
(Continued)

(58) Field of Classification Search
CPC .... G03B 21/008; G03B 21/28; G03B 21/208; H04N 9/315; H04N 9/3105; H04N 9/3158; H04N 9/3161; H04N 9/3197
See application file for complete search history.

(56) References Cited

U.S. PATENT DOCUMENTS 5,914,817 A * 6/1999 Browning .......... G02B 27/1026
204/192.26
6,665,122 B1 * 12/2003 Yamagishi ............... G02B 5/04
348/E5.141
(Continued)

FOREIGN PATENT DOCUMENTS

JP 2007-058166 A 3/2007
JP 2008-111889 A 5/2008
(Continued)

OTHER PUBLICATIONS

International Search Report issued in corresponding application No. PCT/JP2014/074476 dated Dec. 2, 2014 (5 pages).
(Continued)

*Primary Examiner* — Sultan Chowdhury
(74) *Attorney, Agent, or Firm* — Osha Liang LLP

(57) ABSTRACT

Provided are a color separating and combining prism and an optical system using the same for a projector. A color separating and combining prism (DP) includes dichroic films (B, R) that reflect the light of the wavelength range of either a first or third range from among the first wavelength range of a blue region, a second wavelength range of a green region, and a third wavelength range of a red region, and pass the light of the remaining two adjacent wavelength ranges, and at a specific angle of incidence, the average reflectance in the two wavelength ranges which the films pass is lower than the wavelength average reflectance of the wavelength region sandwiched by the two wavelength ranges.

14 Claims, 13 Drawing Sheets

(51) Int. Cl.
 *G03B 21/20* (2006.01)
 *G02B 27/14* (2006.01)
 *G03B 21/14* (2006.01)

(52) U.S. Cl.
 CPC ....... *G03B 21/2093* (2013.01); *H04N 9/3161* (2013.01); *G03B 21/14* (2013.01)

(56) References Cited

U.S. PATENT DOCUMENTS

| | | | |
|---|---|---|---|
| 2007/0019298 A1 | 1/2007 | Sawai et al. | |
| 2007/0019299 A1 | 1/2007 | Sawai et al. | |
| 2008/0002155 A1* | 1/2008 | Ishii | G03B 21/14 353/30 |
| 2008/0278693 A1* | 11/2008 | Sawai | G03B 21/208 353/38 |
| 2010/0033685 A1 | 2/2010 | Seo et al. | |
| 2011/0122374 A1* | 5/2011 | Maeda | G03B 21/008 353/81 |
| 2013/0188154 A1* | 7/2013 | Tomioka | G03B 21/008 353/31 |

FOREIGN PATENT DOCUMENTS

| | | |
|---|---|---|
| JP | 2010-040443 A | 2/2010 |
| JP | 2011-137878 A | 7/2011 |

OTHER PUBLICATIONS

Written Opinion of the International Searching Authority issued in corresponding application No. PCT/JP2014/074476 dated Dec. 2, 2014 (5 pages).

* cited by examiner

FIG.3A

COMPARATIVE EXAMPLE OF BLUE DICHROIC FILM

| LAYER NUMBER | MATERIAL | REFRACTIVE INDEX | FILM THICKNESS(nm) |
|---|---|---|---|
| 30 | $SiO_2$ | 1.47 | 137.51 |
| 29 | $TiO_2$ | 2.41 | 40.18 |
| 28 | $Al_2O_3+La_2O_3$ | 1.74 | 64.52 |
| 27 | $TiO_2$ | 2.41 | 41.45 |
| 26 | $Al_2O_3+La_2O_3$ | 1.74 | 67.83 |
| 25 | $TiO_2$ | 2.41 | 43.14 |
| 24 | $Al_2O_3+La_2O_3$ | 1.74 | 68.97 |
| 23 | $TiO_2$ | 2.41 | 42.84 |
| 22 | $Al_2O_3+La_2O_3$ | 1.74 | 68.46 |
| 21 | $TiO_2$ | 2.41 | 42.92 |
| 20 | $Al_2O_3+La_2O_3$ | 1.74 | 69.22 |
| 19 | $TiO_2$ | 2.41 | 43.37 |
| 18 | $Al_2O_3+La_2O_3$ | 1.74 | 69.24 |
| 17 | $TiO_2$ | 2.41 | 43.04 |
| 16 | $Al_2O_3+La_2O_3$ | 1.74 | 68.90 |
| 15 | $TiO_2$ | 2.41 | 43.17 |
| 14 | $Al_2O_3+La_2O_3$ | 1.74 | 69.41 |
| 13 | $TiO_2$ | 2.41 | 43.34 |
| 12 | $Al_2O_3+La_2O_3$ | 1.74 | 68.97 |
| 11 | $TiO_2$ | 2.41 | 42.77 |
| 10 | $Al_2O_3+La_2O_3$ | 1.74 | 68.60 |
| 9 | $TiO_2$ | 2.41 | 43.16 |
| 8 | $Al_2O_3+La_2O_3$ | 1.74 | 69.27 |
| 7 | $TiO_2$ | 2.41 | 42.84 |
| 6 | $Al_2O_3+La_2O_3$ | 1.74 | 66.71 |
| 5 | $TiO_2$ | 2.41 | 41.01 |
| 4 | $Al_2O_3+La_2O_3$ | 1.74 | 67.15 |
| 3 | $TiO_2$ | 2.41 | 44.29 |
| 2 | $Al_2O_3+La_2O_3$ | 1.74 | 64.68 |
| 1 | $TiO_2$ | 2.41 | 23.42 |
| | PRISM BASE | 1.52 | |

FIG.3B

EXAMPLE 1 OF BLUE DICHROIC FILM

| LAYER NUMBER | MATERIAL | REFRACTIVE INDEX | FILM THICKNESS(nm) |
|---|---|---|---|
| 30 | $SiO_2$ | 1.47 | 130.21 |
| 29 | $TiO_2$ | 2.41 | 48.98 |
| 28 | $Al_2O_3+La_2O_3$ | 1.74 | 53.30 |
| 27 | $TiO_2$ | 2.41 | 43.99 |
| 26 | $Al_2O_3+La_2O_3$ | 1.74 | 62.67 |
| 25 | $TiO_2$ | 2.41 | 47.13 |
| 24 | $Al_2O_3+La_2O_3$ | 1.74 | 66.49 |
| 23 | $TiO_2$ | 2.41 | 60.40 |
| 22 | $Al_2O_3+La_2O_3$ | 1.74 | 35.00 |
| 21 | $TiO_2$ | 2.41 | 63.86 |
| 20 | $Al_2O_3+La_2O_3$ | 1.74 | 58.47 |
| 19 | $TiO_2$ | 2.41 | 51.22 |
| 18 | $Al_2O_3+La_2O_3$ | 1.74 | 55.12 |
| 17 | $TiO_2$ | 2.41 | 51.17 |
| 16 | $Al_2O_3+La_2O_3$ | 1.74 | 64.58 |
| 15 | $TiO_2$ | 2.41 | 50.65 |
| 14 | $Al_2O_3+La_2O_3$ | 1.74 | 62.42 |
| 13 | $TiO_2$ | 2.41 | 50.69 |
| 12 | $Al_2O_3+La_2O_3$ | 1.74 | 57.98 |
| 11 | $TiO_2$ | 2.41 | 53.04 |
| 10 | $Al_2O_3+La_2O_3$ | 1.74 | 51.53 |
| 9 | $TiO_2$ | 2.41 | 55.09 |
| 8 | $Al_2O_3+La_2O_3$ | 1.74 | 59.91 |
| 7 | $TiO_2$ | 2.41 | 54.05 |
| 6 | $Al_2O_3+La_2O_3$ | 1.74 | 53.86 |
| 5 | $TiO_2$ | 2.41 | 46.67 |
| 4 | $Al_2O_3+La_2O_3$ | 1.74 | 58.19 |
| 3 | $TiO_2$ | 2.41 | 50.12 |
| 2 | $Al_2O_3+La_2O_3$ | 1.74 | 60.53 |
| 1 | $TiO_2$ | 2.41 | 21.02 |
| | PRISM BASE | 1.52 | |

FIG.3C

EXAMPLE 2 OF BLUE DICHROIC FILM

| LAYER NUMBER | MATERIAL | REFRACTIVE INDEX | FILM THICKNESS(nm) |
|---|---|---|---|
| 30 | $SiO_2$ | 1.47 | 135.55 |
| 29 | $TiO_2$ | 2.41 | 49.83 |
| 28 | $SiO_2$ | 1.47 | 54.29 |
| 27 | $TiO_2$ | 2.41 | 42.79 |
| 26 | $SiO_2$ | 1.47 | 63.45 |
| 25 | $TiO_2$ | 2.41 | 59.39 |
| 24 | $SiO_2$ | 1.47 | 48.92 |
| 23 | $TiO_2$ | 2.41 | 63.53 |
| 22 | $SiO_2$ | 1.47 | 35.00 |
| 21 | $TiO_2$ | 2.41 | 74.44 |
| 20 | $SiO_2$ | 1.47 | 47.26 |
| 19 | $TiO_2$ | 2.41 | 57.93 |
| 18 | $SiO_2$ | 1.47 | 47.76 |
| 17 | $TiO_2$ | 2.41 | 54.50 |
| 16 | $SiO_2$ | 1.47 | 68.77 |
| 15 | $TiO_2$ | 2.41 | 62.41 |
| 14 | $SiO_2$ | 1.47 | 35.00 |
| 13 | $TiO_2$ | 2.41 | 63.18 |
| 12 | $SiO_2$ | 1.47 | 54.39 |
| 11 | $TiO_2$ | 2.41 | 66.87 |
| 10 | $SiO_2$ | 1.47 | 35.00 |
| 9 | $TiO_2$ | 2.41 | 60.57 |
| 8 | $SiO_2$ | 1.47 | 59.33 |
| 7 | $TiO_2$ | 2.41 | 59.60 |
| 6 | $SiO_2$ | 1.47 | 48.85 |
| 5 | $TiO_2$ | 2.41 | 50.81 |
| 4 | $SiO_2$ | 1.47 | 55.40 |
| 3 | $TiO_2$ | 2.41 | 54.31 |
| 2 | $SiO_2$ | 1.47 | 52.28 |
| 1 | $TiO_2$ | 2.41 | 25.90 |
|  | PRISM BASE | 1.52 |  |

FIG.4A

COMPARATIVE EXAMPLE OF RED DICHROIC FILM

| LAYER NUMBER | MATERIAL | REFRACTIVE INDEX | FILM THICKNESS(nm) |
|---|---|---|---|
| 27 | $SiO_2$ | 1.47 | 71.91 |
| 26 | $Nb_2O_5$ | 2.23 | 72.29 |
| 25 | $Al_2O_3$ | 1.66 | 120.70 |
| 24 | $Nb_2O_5$ | 2.23 | 69.92 |
| 23 | $Al_2O_3$ | 1.66 | 115.57 |
| 22 | $Nb_2O_5$ | 2.23 | 71.58 |
| 21 | $Al_2O_3$ | 1.66 | 107.09 |
| 20 | $Nb_2O_5$ | 2.23 | 76.65 |
| 19 | $Al_2O_3$ | 1.66 | 97.74 |
| 18 | $Nb_2O_5$ | 2.23 | 79.31 |
| 17 | $Al_2O_3$ | 1.66 | 97.74 |
| 16 | $Nb_2O_5$ | 2.23 | 75.39 |
| 15 | $Al_2O_3$ | 1.66 | 108.28 |
| 14 | $Nb_2O_5$ | 2.23 | 67.93 |
| 13 | $Al_2O_3$ | 1.66 | 115.62 |
| 12 | $Nb_2O_5$ | 2.23 | 66.82 |
| 11 | $Al_2O_3$ | 1.66 | 110.57 |
| 10 | $Nb_2O_5$ | 2.23 | 75.06 |
| 9 | $Al_2O_3$ | 1.66 | 96.76 |
| 8 | $Nb_2O_5$ | 2.23 | 83.64 |
| 7 | $Al_2O_3$ | 1.66 | 87.16 |
| 6 | $Nb_2O_5$ | 2.23 | 85.47 |
| 5 | $Al_2O_3$ | 1.66 | 95.61 |
| 4 | $Nb_2O_5$ | 2.23 | 82.30 |
| 3 | $Al_2O_3$ | 1.66 | 111.12 |
| 2 | $Nb_2O_5$ | 2.23 | 88.29 |
| 1 | $Al_2O_3$ | 1.66 | 69.83 |
|  | PRISM BASE | 1.52 |  |

FIG.4B

EXAMPLE 1 OF RED DICHROIC FILM

| LAYER NUMBER | MATERIAL | REFRACTIVE INDEX | FILM THICKNESS(nm) |
|---|---|---|---|
| 27 | $SiO_2$ | 1.47 | 95.40 |
| 26 | $Nb_2O_5$ | 2.23 | 125.95 |
| 25 | $Al_2O_3$ | 1.66 | 162.66 |
| 24 | $Nb_2O_5$ | 2.23 | 61.90 |
| 23 | $Al_2O_3$ | 1.66 | 131.86 |
| 22 | $Nb_2O_5$ | 2.23 | 75.02 |
| 21 | $Al_2O_3$ | 1.66 | 91.06 |
| 20 | $Nb_2O_5$ | 2.23 | 89.67 |
| 19 | $Al_2O_3$ | 1.66 | 80.29 |
| 18 | $Nb_2O_5$ | 2.23 | 80.21 |
| 17 | $Al_2O_3$ | 1.66 | 101.30 |
| 16 | $Nb_2O_5$ | 2.23 | 77.16 |
| 15 | $Al_2O_3$ | 1.66 | 100.32 |
| 14 | $Nb_2O_5$ | 2.23 | 71.17 |
| 13 | $Al_2O_3$ | 1.66 | 114.50 |
| 12 | $Nb_2O_5$ | 2.23 | 67.74 |
| 11 | $Al_2O_3$ | 1.66 | 101.44 |
| 10 | $Nb_2O_5$ | 2.23 | 78.30 |
| 9 | $Al_2O_3$ | 1.66 | 103.15 |
| 8 | $Nb_2O_5$ | 2.23 | 69.81 |
| 7 | $Al_2O_3$ | 1.66 | 113.67 |
| 6 | $Nb_2O_5$ | 2.23 | 76.54 |
| 5 | $Al_2O_3$ | 1.66 | 89.25 |
| 4 | $Nb_2O_5$ | 2.23 | 89.51 |
| 3 | $Al_2O_3$ | 1.66 | 101.56 |
| 2 | $Nb_2O_5$ | 2.23 | 93.98 |
| 1 | $Al_2O_3$ | 1.66 | 65.18 |
| | PRISM BASE | 1.52 | |

FIG.4C

EXAMPLE 2 OF RED DICHROIC FILM

| LAYER NUMBER | MATERIAL | REFRACTIVE INDEX | FILM THICKNESS(nm) |
|---|---|---|---|
| 27 | $SiO_2$ | 1.47 | 96.40 |
| 26 | $Nb_2O_5$ | 2.23 | 118.06 |
| 25 | $SiO_2$ | 1.47 | 169.99 |
| 24 | $Nb_2O_5$ | 2.23 | 73.24 |
| 23 | $SiO_2$ | 1.47 | 147.08 |
| 22 | $Nb_2O_5$ | 2.23 | 62.70 |
| 21 | $SiO_2$ | 1.47 | 164.90 |
| 20 | $Nb_2O_5$ | 2.23 | 35.00 |
| 19 | $SiO_2$ | 1.47 | 148.58 |
| 18 | $Nb_2O_5$ | 2.23 | 84.50 |
| 17 | $SiO_2$ | 1.47 | 76.18 |
| 16 | $Nb_2O_5$ | 2.23 | 87.16 |
| 15 | $SiO_2$ | 1.47 | 130.56 |
| 14 | $Nb_2O_5$ | 2.23 | 59.21 |
| 13 | $SiO_2$ | 1.47 | 143.44 |
| 12 | $Nb_2O_5$ | 2.23 | 79.71 |
| 11 | $SiO_2$ | 1.47 | 62.59 |
| 10 | $Nb_2O_5$ | 2.23 | 93.01 |
| 9 | $SiO_2$ | 1.47 | 118.72 |
| 8 | $Nb_2O_5$ | 2.23 | 71.50 |
| 7 | $SiO_2$ | 1.47 | 129.73 |
| 6 | $Nb_2O_5$ | 2.23 | 80.96 |
| 5 | $SiO_2$ | 1.47 | 85.97 |
| 4 | $Nb_2O_5$ | 2.23 | 96.03 |
| 3 | $SiO_2$ | 1.47 | 108.99 |
| 2 | $Nb_2O_5$ | 2.23 | 98.46 |
| 1 | $SiO_2$ | 1.47 | 35.00 |
|  | PRISM BASE | 1.52 |  |

COLOR SEPARATING AND COMBINING PRISM AND PROJECTOR USING SAME

The present U.S. patent application is a U.S. National phase Application under 35 U.S.C. 371 of International Application PCT/JP2014/074476 filed on Sep. 17, 2014. This application claims a priority under the Paris Convention of Japanese Patent Application No. 2013-252229 filed on Dec. 5, 2013, the entirety of each of which is incorporated herein by reference.

BACKGROUND

Technical Field

The present invention relates to a color separating and combining prism incorporated in a projector, and in particular to a color separating and combining prism suitable for a projector employing a laser light source as an illumination light source, and a projector employing the same.

Background Art

Projectors employing an image display device such as a reflective liquid crystal panel or a digital micro-mirror device (DMD) have conventionally been known as apparatuses for projecting digital information such as video images contained in video recorders and documents and images contained in personal computers. Such a projector includes an illumination light source configured to radiate illumination light, an illumination optical system configured to guide the illumination light from the illumination light source to an image display device, and a projection optical system configured to guide projection light from the image display device to a projection lens.

The illumination light emanating from the illumination light source is guided and split into light rays of three colors of red, blue, and green through the illumination optical system, and guided to image display devices corresponding to the respective colors. The illumination light rays directed to the image display devices emanate from the image display devices as projection light rays, and the projection light rays are combined again, guided to the projection lens via the projection optical system, and projected onto a screen.

Furthermore, a color separating and combining prism is used to separate the illumination light and combine the projection light. That is, the color separating and combining prism is an optical member used for both of an optical system for guiding the illumination light and an optical system for guiding the projection light, and each constituted by a combination of a plurality of triangular prisms. Furthermore, dichroic films for separating and combining light are formed on predetermined surfaces, and the separation of the illumination light and the combination of the projection light rays are performed by reflecting a light ray having a predetermined wavelength on each dichroic film and allowing light rays having wavelengths other than the predetermined wavelength to pass through each dichroic film.

Conventionally used as the illumination light source are high-intensity xenon lamps, high-pressure mercury lamps, and the like. In recent years, light emitting diodes (LEDs) and laser light sources using semiconductor lasers have been in practical use for improvement in luminous efficiency and increase in luminous quantity. In particular, the development of blue laser light sources has led to the development of illumination light sources using light sources of three primary colors, which are blue laser light sources, green laser light sources, and red laser light sources.

With this background, there has already been proposed an image projection system provided with an illumination light source including laser light sources for the three respective primary colors of blue, green, and red, a color separating and combining prism, and a reflective image display device (see, for example, Patent Literature 1 listed below). Further, for large-screen projection of images, there has already been proposed an image projection system provided with a light source including a high-power xenon lamp, a color separating and combining prism, and a reflective image display device (see, for example, Patent Literature 2 listed below).

CITATION LIST

Patent Literature

Patent Literature 1: JP-A-2008-111889
Patent Literature 2: JP-A-2007-58166

It is desirable, in an optical system (a projector) employing a color separating and combining prism, to securely reflect light rays within a predetermined wavelength band and to securely transmit the other light rays. If the light rays to be transmitted are partly reflected, the unnecessarily reflected light rays not only degrade imaging performance but also cause loss of light according to the amount of the unnecessarily reflected light rays, to disadvantageously lower the efficiency of using illumination light.

Furthermore, if part of the light rays in a wavelength band to be reflected are transmitted, the unnecessarily transmitted light rays become stray light which is a main cause of degraded image quality, and loss of light is caused according to the amount of the unnecessarily transmitted light rays, to disadvantageously lower the efficiency of using illumination light.

The optical system disclosed in Patent Literature 1 prevents entry of unnecessary light rays from an image display device into a dichroic film and performs separation processing on the unnecessary light rays, and thereby improves the contrast of a projected image. Here, however, sufficient consideration has not been given to alleviating effects of unnecessarily reflected light rays to improve the efficiency of using light radiated from the light source by reducing the reflectance for light rays transmitted through the dichroic film.

In the optical system disclosed in Patent Literature 2, a highly heat conductive material is contained in a dichroic film so that projection images will not deteriorate even when a high power light source is used. However, in Patent Literature 2, either, sufficient consideration has not been given to alleviating effects of unnecessarily reflected light rays to improve the efficiency of using light radiated from the light source by reducing the reflectance for light rays transmitted through the dichroic film.

In a case where high-power laser light is used, light rays in a transmission wavelength range are unnecessarily reflected to cause a disadvantageously degraded imaging performance, and furthermore, concerns are raised that the unnecessarily reflected light may result in unnecessary damage by being reflected to outside a prism optical surface to be absorbed by an adhesive, for example, to generate heat there, and this is a disadvantage.

SUMMARY

In one or more embodiments, a projector includes an illumination light source that radiates laser light and a color separating and combining prism, a light separating and combining prism capable of alleviating effects of unnecessarily reflected light by reducing reflection of light transmitted through a prism and improving efficiency of using light, and an optical system (a projector) employing the same.

In one or more embodiments, a color separating and combining prism is incorporated in a projector including an illumination optical system configured to guide illumination light radiated by blue, green, and red laser light sources to an image display device, and a projection optical system configured to guide projection light from the image display device to a projection lens, and the color separating and combining prism has a function of separating illumination light and combining projection light rays. Here, the color separating and combining prism has a dichroic film that reflects light in, among a first wavelength range in a blue region, a second wavelength range in a green region, and a third wavelength range in a red region, the first or third wavelength range, and transmits light in the other two wavelength ranges, which are adjacent to each other, and, at a predetermined angle of incidence, an average reflectance in the other two wavelength ranges light in which is transmitted through the dichroic film is lower than a wavelength-averaged reflectance in a wavelength region sandwiched between the other two wavelength ranges.

With the above configuration, in which the laser light sources radiate light rays in respective predetermined wavelength ranges, the first wavelength range in the blue region, the second wavelength range in the green region, and the third wavelength range in the red region each have a specific wavelength range. Thus, light rays in two adjacent wavelength ranges transmitted through a predetermined dichroic film are mainly light rays in the respective specific wavelength ranges, and it is clear that almost no light rays in a wavelength region sandwiched between the two wavelength ranges are included in the light rays in the two adjacent wavelength ranges. This eliminates the need of uniformly reducing the reflectance for the entire wavelength ranges, and thus makes it possible to reduce generation of unnecessarily reflected light by lowering the reflectance for part of the ranges corresponding to the respective specific wavelength ranges. Thus, in an optical system including an illumination light source that radiates laser light and a color separating and combining prism, it is possible to obtain a light separating and combining prism capable of reducing reflection of light transmitted through a prism and improving the efficiency of using light.

Furthermore, according to one or more embodiments, in the color separating and combining prism configured as described above, a wavelength-averaged reflectance in the wavelength ranges light in which is transmitted through the dichroic film is 0.5% or lower both at a center angle of incidence of illumination light and at a center angle of incidence of projection light. According to this configuration, the reflectance for light passing through the dichroic film is 0.5% or lower, and thus, even with high-power light radiated by the laser light sources, it is possible to reduce reflected light, and to improve the efficiency of using light.

According to one or more embodiments, in the color separating and combining prism configured as described above, the first wavelength range in the blue region is 440 to 470 nm, the second wavelength range in the green region is 520 to 550 nm, and the third wavelength range in the red region is 630 to 660 nm. This configuration makes possible application of various laser light sources obtained by wavelength conversion on outputs from semiconductor lasers by using nonlinear crystals, in addition to semiconductor lasers, LEDs, etc. configured to emit light in predetermined wavelength ranges.

According to one or more embodiments, an optical system (a projector) employs the color separating and combining prism configured as described above. According to this configuration, which employs a color separating and combining prism having a dichroic film formed such that an average reflectance in two wavelength ranges light in which is transmitted through the dichroic film is lower than a wavelength-averaged reflectance in a wavelength region sandwiched between the two wavelength ranges, it is possible to reduce reflection of light transmitted through a prism to thereby reduce reflected light rays, and thus to obtain an optical system (a projector) capable of improving efficiency of using light.

According to one or more embodiments, in a projector including an illumination light source configured to radiate laser light and a color separating and combining prism, it is possible to obtain a light separating and combining prism capable of reducing reflection of light that passes through a prism to thereby improve efficiency of using light and an optical system (a projector) employing the same.

BRIEF DESCRIPTION OF THE DRAWINGS

FIG. 3A is a chart for illustrating a configuration of a comparative example of a dichroic film that reflects blue light;

FIG. 3B is a chart for illustrating a configuration of Example 1 of the dichroic film that reflects blue light;

FIG. 3C is a chart for illustrating a configuration of Example 2 of the dichroic film that reflects blue light;

FIG. 4A is a chart for illustrating a configuration of a comparative example of a dichroic film that reflects red light;

FIG. 4B is a chart for illustrating a configuration of Example 1 of the dichroic film that reflects red light;

FIG. 4C is a chart for illustrating a configuration of Example 2 of the dichroic film that reflects red light;

DETAILED DESCRIPTION OF EMBODIMENTS

Figure 1:
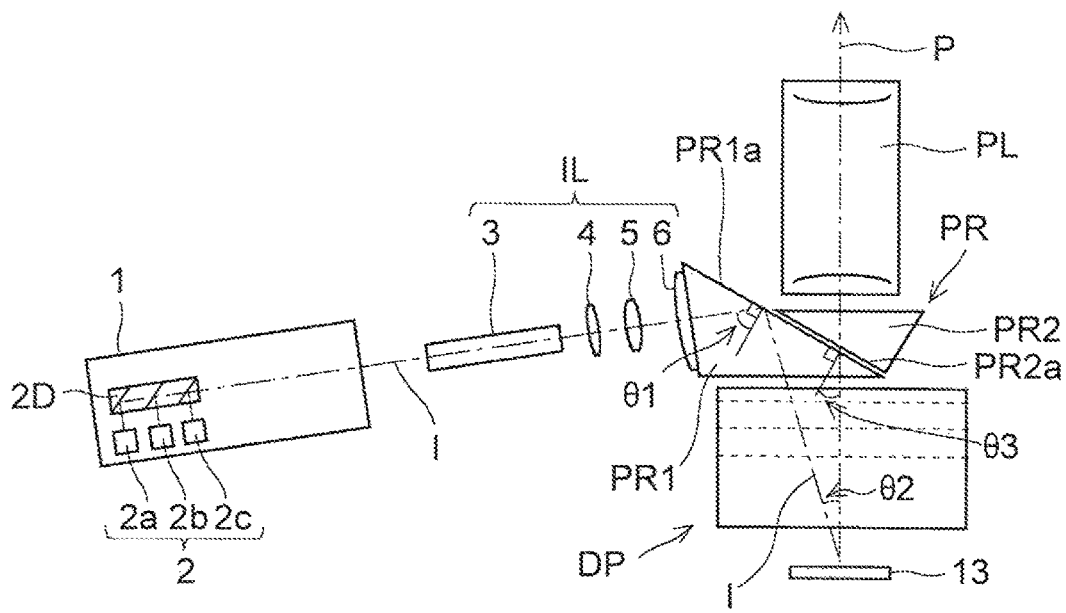
FIG. 1 is a schematic diagram illustrating an outline of an optical system employing a color separating and combining prism according to one or more embodiments.

Embodiments of the present invention will be described below with reference to the drawings; the present invention, however, is not limited thereto. Components having the same configurations will be designated by the same reference numerals and overlapping descriptions will not be repeated when possible.

A color separating and combining prism according to one or more embodiments is a prism suitably applicable to a projector, and an optical system employing the color separating and combining prism is an optical system for a projector, for example. Furthermore, the prism and the optical system are suitably applied to a projector employing a laser light source as an illumination light source. For example, as illustrated in FIG. 1, the optical system includes an illumination optical system IL configured to guide illumination light I from an illumination light source 1 configured to radiate laser light, a prism PR for a projection optical system, a color separating and combining prism DP, an image display device 13, and a projection optical system PL configured to guide projection light P from the image display device 13 to a projection screen.

The illumination light source 1 includes a laser light source 2 constituted by semiconductor lasers of the three primary colors, namely, a blue laser light source 2a configured to emit blue light in a first wavelength range, a green laser light source 2b configured to emit green light in a second wavelength range, and a red laser light source 2c configured to emit red light in a third wavelength range, for example. Laser light rays from the plurality of light sources are combined into one beam of illumination light I via light combining means 2D. The light combining means 2D may be a conventionally known device combining dichroic mirrors that reflect light rays of respective colors, for example.

The illumination light I radiated by the illumination light source 1 enters the prism PR for the projection optical system via the illumination optical system IL, totally reflected toward the color separating and combining prism DP via a first surface PR1a, and enters the image display device 13 from the color separating and combining prism DP. Furthermore, light modulated by the image display device 13 emanates as projection light toward the color separating and combining prism DP, passes through the color separating and combining prism DP and the prism PR for the projection optical system, to be projected onto an unillustrated screen via the projection optical system PL.

Here, the illumination optical system IL includes a rod integrator 3, a condenser lens 4, and a relay lens 5, for example. Laser light from the illumination light source 1 enters the rod integrator 3 to be repeatedly reflected on an inner surface thereof, emanates from the rod integrator as light having uniform light quantity distribution, passes through the condenser lens 4 and the relay lens 5, and then enters the prism PR for the projection optical system via an entrance lens 6 disposed on an entrance side of the prism (total internal reflection prism) PR for the projection optical system.

The prism PR for the projection optical system has a first prism PR1 and a second prism PR2, each of which is a substantially triangular prism, and the prism PR has a first surface PR1a on which the illumination light I is totally reflected. The projection light P passes through the first surface PR1a. The prism PR also has a second surface PR2a that faces the first surface PR1a via an air gap, and the projection light P emanating from the first surface PR1a passes through the second surface PR2a.

That is, the prism PR for the projection optical system has the first surface PR1a on which the illumination light I is totally reflected and through which the projection light P passes, and a second surface PR2a which the projection light P enters via the air gap, and through which the projection light P passes. The first surface PR1a totally reflects the illumination light I and transmits the projection light P, and this is achieved by the following setting, that is, an angle of incidence θ1 of the illumination light I with respect to the first surface PR1a is set to an angle equal to or larger than a total reflection angle, and an angle of incidence θ3 of the projection light P with respect to the first surface PR1a is set to an angle equal to or smaller than a total reflection angle.

The first surface PR1a and the second surface PR2a are surfaces through which the projection light P passes, and thus, by providing a reflection prevention film on these surfaces, it is possible to reduce reflectance for the projection light P on these surfaces when the projection light P passes therethrough, and prevent unnecessary production of reflection light.

As described above, the prism PR for the projection optical system separates input light and output light with respect to the image display device 13. The first prism PR1 totally reflects the illumination light I from the illumination optical system IL on the first surface PR1a, and guides the illumination light I into the color separating and combining prism DP.

The color separating and combining prism DP separates the illumination light I into the respective colors of red, green, and blue, and combines the light rays of the respective colors modulated by the image display device 13.

Figure 2:
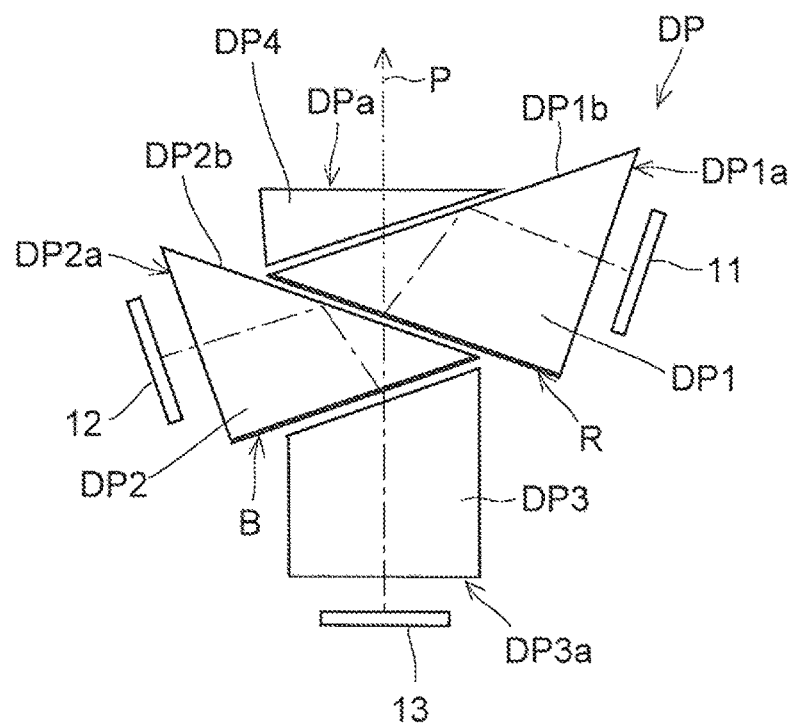
FIG. 2 is a vertical sectional view of the color separating and combining prism that the optical system of FIG. 1 includes.

Next, an example of the color separating and combining prism DP will be described with reference to FIG. 2. The color separating and combining prism DP includes a combination of a substantially triangular first prism DP1, a substantially triangular second prism DP2, a substantially quadrangular third prism DP3, and a substantially triangular clear prism DP4. A surface of the first prism DP1 facing the second prism DP2 functions as a dichroic surface, and a dichroic film R that reflects red light is formed on this surface. Note that an air gap is provided between the first prism DP1 and the second prism DP2. Furthermore, a surface of the second prism DP2 facing the third prism DP3 functions as a dichroic surface, and a dichroic film B that reflects blue light is formed on this surface.

An air gap is provided also between the second prism DP2 and the third prism DP3. Note that the positions where the dichroic film R and the dichroic film B are formed may be reversed. Although the clear prism DP4 is used in the color separating and combining prism DP in one or more embodiments, the clear prism DP4 may be omitted.

A red ray in the illumination light I that has entered the clear prism DP4 through an entrance/exit surface DPa, which is a top surface of the clear prism DP4, is reflected by the dichroic film R, while blue and green rays in the illumination light I pass through the dichroic film R. The red ray reflected by the dichroic film R is totally reflected on a side surface DP1b of the first prism DP1, emanates from the first prism DP1 through an entrance/exit surface DP1a of the first prism DP1, and illuminates an image display device 11 for red. Note that reflective liquid crystal display devices may be of other types than DMDs, such as reflective liquid crystal display devices, for example.

On the other hand, the blue ray that has passed through the dichroic film R is reflected on the dichroic film B of the second prism DP2, while the green ray that has passed through the dichroic film R passes through the dichroic film B of the second prism DP2. The blue ray reflected on the dichroic film B is totally reflected on a side surface DP2b of the second prism DP2, emanates from the second prism DP2 through an entrance/exit surface DP2a of the second prism DP2, and illuminates an image display device (DMD) 12 for blue. The green ray that has passed through the dichroic film B emanates from the third prism DP3 through an entrance/exit surface DP3a of the third prism DP3, and illuminates the image display device (DMD) 13 for green.

When a DMD is used for an image display device, micromirrors (not shown) as pixels of the DMD are each tilted at ±12°. When the micromirrors are tilted at 12° toward the side of the optical axis of the illumination light I, the illumination light incident at an angle of incidence $\theta 2=24°$ is emitted as projection light (ON light) in a direction (the optical axis direction of the projection light P) perpendicular to the DMD. On the other hand, when the micromirrors are tilted at 12° in the direction opposite to the side of the optical axis of the illumination light I, the illumination light is emitted as OFF light at an emission angle of 48°. Thereby, optical modulation is performed.

Next, a description will be given of the combining of optical paths of projection light rays from the image display devices (DMDs), that is, the combination of light rays. A red projection light ray reflected on the image display device 11 for red is incident on the entrance/exit surface DP1a of the first prism DP1, totally reflected by the side surface DP1b of the first prism DP1, and then further reflected on the dichroic film R. A blue projection light ray reflected on the image display device 12 for blue is incident on the entrance/exit surface DP2a of the second prism DP2, totally reflected by the side surface DP2b of the second prism DP2, and then further reflected on the dichroic film B. The blue projection light ray then further passes through the dichroic film R of the first prism DP1. On the other hand, a green projection light ray reflected on the image display device 13 for green is incident on the entrance/exit surface DP3a of the third prism DP3, and passes through the dichroic film B and the dichroic film R.

Then, the projection light rays of red, blue, and green are combined into projection light P of one optical axis, which then emanates through the entrance/exit surface DPa of the clear prism DP4 and enters the prism PR for the projection optical system. Subsequently, since the combined projection light P does not satisfy total reflection conditions in the prisms constituting the prism PR for the projection optical system, the projection light P passes through the prism PR for the projection optical system and the air gap, and is projected onto an unillustrated screen by the projection optical system PL composed of a plurality of lenses, etc. Here, the lenses, etc. of the projection optical system PL are not illustrated.

As described above, the dichroic film B and the dichroic film R each reflect light in the first or third wavelength range among the first wavelength range in the blue region, the second wavelength range in the green region, and the third wavelength range in the red region, and each transmit light in the other two adjacent wavelength ranges. In one or more embodiments, the dichroic films B, R are each formed such that, at a predetermined angle of incidence, an average reflectance in the other two wavelength ranges light in which is transmitted through the dichroic film is lower than a wavelength-averaged reflectance in a wavelength region sandwiched between the other two wavelength ranges.

Since a laser light source radiates light in a predetermined wavelength range, the first wavelength range in the blue region, the second wavelength range in the green region, and the third wavelength range in the red region each have its own specific wavelength range. Accordingly, it is clear that light rays in the two adjacent wavelength ranges transmitted through the dichroic films B or R are mainly light rays in the respective specific wavelength ranges, and that hardly any light rays in the wavelength region sandwiched between these two wavelength ranges are included in the transmitted light rays. Thus, it is not necessary to uniformly reduce reflectances for all the light rays in two wavelength ranges to be low, and it is possible to reduce unnecessary reflection of light by reducing the reflectances for light rays corresponding to the respective specific wavelength ranges. Thus, in the optical system including the illumination light source 1 employing laser light sources and the color separating and combining prism DP, even with high-power light rays radiated by the laser light sources, it is possible to reduce reflection of light rays passing through prisms to thereby reduce reflected light rays, and thus it is possible to obtain a color separating and combining prism DP capable of improving the efficiency of using light.

Furthermore, in one or more embodiments, a wavelength-averaged reflectance in the wavelength ranges light in which is transmitted through the dichroic film be 0.5% or lower both at a center angle of incidence of the illumination light I and at a center angle of incidence of the projection light P. With this configuration, it is possible to reduce the reflectance for light passing through the dichroic films B, R to be sufficiently low, and thus to improve the efficiency of using light radiated by the laser light sources.

The dichroic films B, R are each a dielectric multilayer film formed by stacking a plurality of dielectric thin films. A conventionally known method such as a vacuum vapor deposition method, an ion assisted deposition (IAD) method, an ion plating (IP) method, and a sputtering method can be used as the method for forming the dielectric multilayer film. A typical conventional dichroic film is made of a dielectric multilayer film aimed at reducing a wavelength-averaged reflectance with respect to all the light rays in a wavelength range light in which is transmitted through the dichroic film. However, in a case where a laser light source is adopted as the illumination light source 1, a configuration is sufficient where mainly a wavelength-averaged reflectance in a predetermined wavelength band is reduced.

In one or more embodiments, laser light radiated by the illumination light source 1 has the first wavelength range of 440 to 470 nm in the blue region, the second wavelength range of 520 to 550 nm in the green region, and the third wavelength range of 630 to 660 nm in the red region. This is because with such a configuration, various laser light sources obtained by wavelength conversion on outputs from semiconductor lasers by using nonlinear crystals can be applied in addition to semiconductor lasers, LEDs, etc. configured to emit light in predetermined wavelength ranges.

For example, a blue semiconductor laser at about 445 nm or a laser at 465 nm obtained by wavelength conversion of a semiconductor laser at 930 nm by using nonlinear crystals is often used for the blue laser light source, a green semiconductor laser at about 525 nm or 545 nm or a laser at 532 nm obtained by wavelength conversion of laser light at 1064 nm by using nonlinear crystals is often used for the green laser light source, and a red semiconductor laser in a wavelength band of about 630 to 660 nm is often used for the red laser light source.

With this in mind, applied in one or more embodiments are the dichroic film R which reflects red light in the third wavelength range of 630 to 660 nm, and which transmits light in the first wavelength range of 440 to 470 nm and in the second wavelength range of 520 to 550 nm, and is capable of suitably reducing the reflectances with respect to light rays in these wavelength bands, and the dichroic film B which reflects blue light in the first wavelength range of 440 to 470 nm, and which transmits light in the second wavelength range of 520 to 550 nm and in the third wavelength range of 630 to 660 nm, and is capable of suitably reducing the reflectances with respect to light rays in these wavelength bands.

Next, descriptions will be given, one by one, of a comparative example and examples of the dichroic film B (BLUE dichro), which reflects blue light, and a comparative example and examples of the dichroic film R (RED dichro), which reflects red light. A process of forming these reflective films adopts an IAD method performed under heating at 150° C., by using BK7 produced by Schott AG as a substrate glass.

Figure 5A:
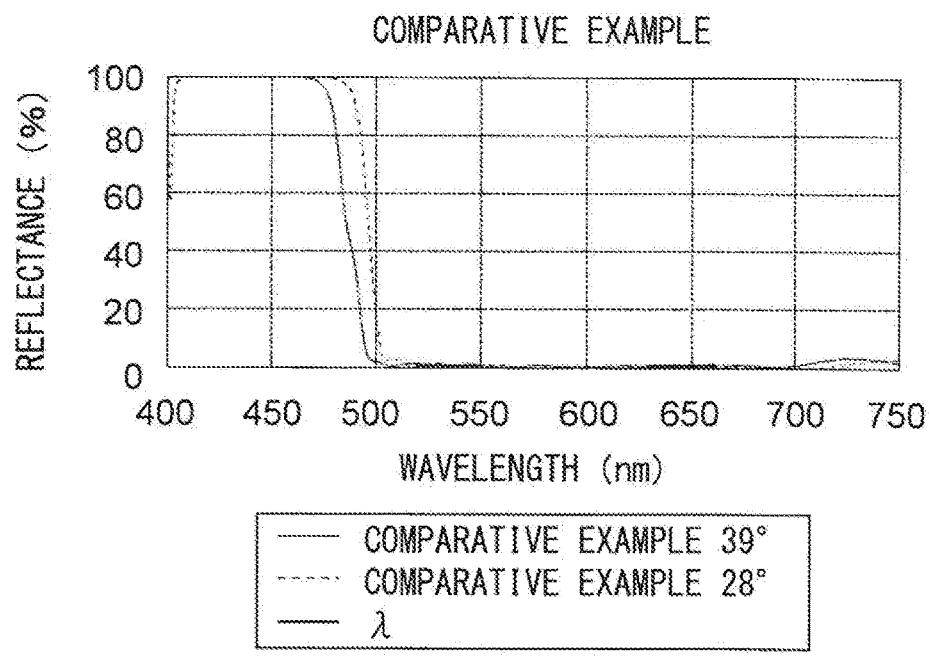
FIG. 5A is a chart for illustrating reflectance of the dichroic film of the comparative example that reflects blue light.
Figure 5B:
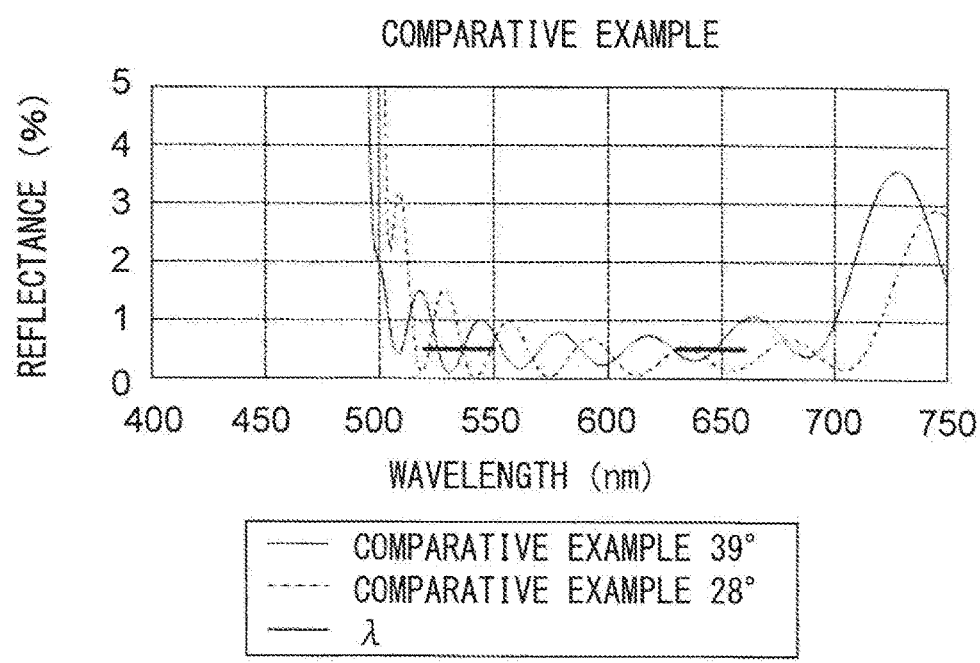
FIG. 5B is a chart for illustrating reflectance of the dichroic film of the comparative example that reflects blue light.

Comparative Example of BLUE Dichro: A description will first be given of a dichroic film (BLUE dichro) having a conventional configuration, which is a 30-layer dielectric multilayer film that reflects blue light, with reference to FIGS. 3A, 5A, and 5B. FIG. 3A shows the configuration of the dichroic film, and FIGS. 5A, 5B show reflectance of the dichroic film.

As shown in FIG. 3A, the dichroic film (BLUE dichro) of the comparative example is formed by laying the following plurality of layers on a substrate glass: odd-numbered layers (layers No. 1, No. 3, . . . , No. 29) each formed as a $TiO_2$ film having a refractive index of 2.41; even-numbered layers (layers No. 2, No. 4, . . . , No. 28) each formed as a mixture film containing $Al_2O_3$ and $La_2O_3$ and having a refractive index of 1.74; and layer No. 30 formed as an $SiO_2$ layer having a refractive index of 1.47.

Used as the substrate glass is the conventionally known BK7 produced by Schott AG, the refractive index of which is 1.52. FIG. 3A shows thicknesses d (nm) of the layers.

The reflectance of this dichroic film was measured at an angle of incidence of 39° (a center angle of incidence) with respect to the illumination light, and at an angle of incidence of 28° (a center angle of incidence) with respect to the projection light. The result of the measurement is shown in FIG. 5A, FIG. 5B. In each of FIG. 5A and FIG. 5B, the horizontal axis represents wavelength range of 400 to 750 nm, and the vertical axis represents reflectance. Here, the vertical axis of FIG. 5A is marked with values from 0 to 100%, while that of FIG. 5B is marked with values from 0 to 5%; that is, FIG. 5B shows difference in reflectance in an enlarged manner.

In FIG. 5A, the reflectance of the dichroic film of FIG. 3A (with respect to a light ray at the illumination-light angle of incidence of 39° and with respect to a light ray at the projection-light angle of incidence of 28°) appears to be substantially 0% in the range of 500 to 750 nm, but the enlarged illustration of FIG. 5B shows that the reflectance varies in the range of 0 to 1% in the range of 500 to 700 nm, and rises up to approximately 3% in the range of 700 to 750 nm.

For example, when this dichroic film is applied to laser light, a reflectance of approximately 1% is expected for the second wavelength range of 520 to 550 nm, and a reflectance of approximately 0.5 to 1.0% is expected for the third wavelength range of 630 to 660 nm.

Comparative Example of RED Dichro: Next, a description will be given of a conventionally-configured dichroic film (RED dichro) which is a 27-layer dielectric multilayer film that reflects red light, with reference to FIGS. 4A, 8A, and 8B. As shown in FIG. 4A, the dichroic film (RED dichro) of the comparative example is formed by laying the following plurality of layers on a substrate glass: odd-numbered layers (layers No. 1, No. 3, . . . , No. 25) each formed as an $Al_2O_3$ film having a refractive index of 1.66; even-numbered layers (layers No. 2, No. 4, . . . , No. 26) each formed as an $Nb_2O_5$ film having a refractive index of 2.23; and layer No. 27 formed as an $SiO_2$ layer having a refractive index of 1.47.

Used as the substrate glass is the conventionally known BK7 produced by Schott AG, the refractive index of which is 1.52. FIG. 4A shows thicknesses d (nm) of the layers.

Figure 8A:
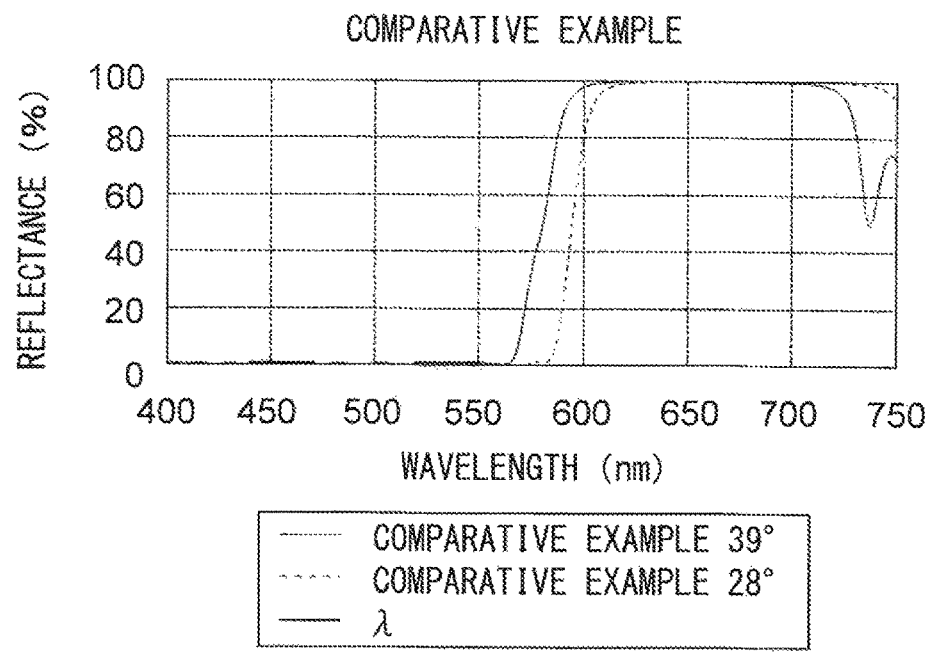
FIG. 8A is a chart for illustrating reflectance of the dichroic film of the comparative example that reflects red light.
Figure 8B:
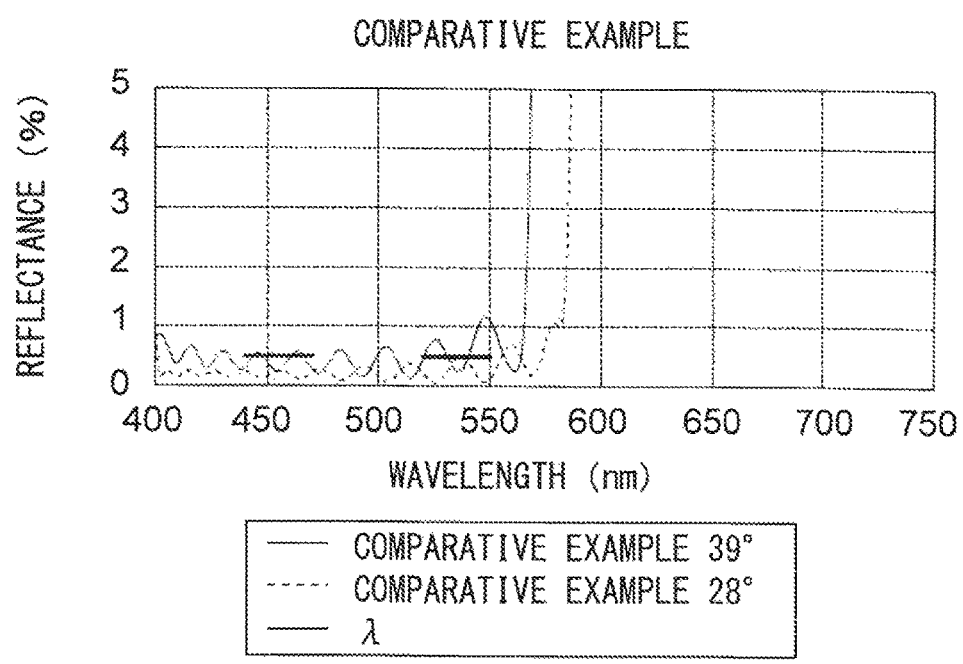
FIG. 8B is a chart for illustrating reflectance of the dichroic film of the comparative example that reflects red light.

The reflectance of this dichroic film was measured at an angle of incidence of 39° with respect to the illumination light, and at an angle of incidence of 28° with respect to the projection light. The result of the measurement is shown in FIG. 8A, FIG. 8B. In each of FIG. 8A and FIG. 8B, the horizontal axis represents wavelength in a range of 400 to 750 nm, and the vertical axis represents reflectance. Here, the vertical axis of FIG. 8A is marked with values from 0 to 100%, while that of FIG. 8B is marked with values from 0 to 5%; that is, FIG. 8B shows difference in reflectance in an enlarged manner.

In FIG. 8A, the reflectance of the dichroic film of FIG. 4A (with respect to a light ray at the illumination-light angle of incidence of 39° and with respect to a light ray at the projection-light angle of incidence of 28°) appears to be substantially 0% for the range of 400 to 560 nm, but the enlarged illustration of FIG. 8B shows that the reflectance varies in the range of 0 to 0.5% for the range of 400 to 500 nm, and rises up to approximately 1% for the range of 500 to 560 nm.

For example, when this dichroic film is applied to laser light, a reflectance of approximately 0.5% is expected for the first wavelength range of 440 to 470 nm, and a reflectance of approximately 1% is expected for the second wavelength range of 520 to 550 nm.

As a result of study on producing a dichroic film in such wavelength ranges of laser light, it has been found that use of dielectric multilayer films shown in FIGS. 3B, 3C, 4B, and 4C makes it possible to reduce reflection.

Example 1 of BLUE Dichro: A description will be given of a dichroic film according to one or more embodiments (the dichroic film corresponding to the dichroic film B according to one or more embodiments), with reference to FIG. 3B, FIG. 6A, and FIG. 6B. FIG. 3B shows a configuration of the dichroic film, and FIGS. 6A, 6B show reflectance of the dichroic film.

As shown in FIG. 3B, the dichroic film according to one or more embodiments (Example 1 of the BLUE dichro) is formed by laying the following plurality of layers on a substrate glass in the same manner as in the case of the previously described comparative example: odd-numbered layers (layers No. 1, No. 3, . . . , No. 29) each formed as a $TiO_2$ film having a refractive index of 2.41; even-numbered layers (layers No. 2, No. 4, . . . , No. 28) each formed as a mixture film containing $Al_2O_3$ and $La_2O_3$ and having a refractive index of 1.74; and layer No. 30 formed as an $SiO_2$ layer having a refractive index of 1.47.

However, the layers have thicknesses d (nm) different from those in the comparative example. Used as the substrate glass is the conventionally known BK7 produced by Schott AG, the refractive index of which is 1.52.

Figure 6A:
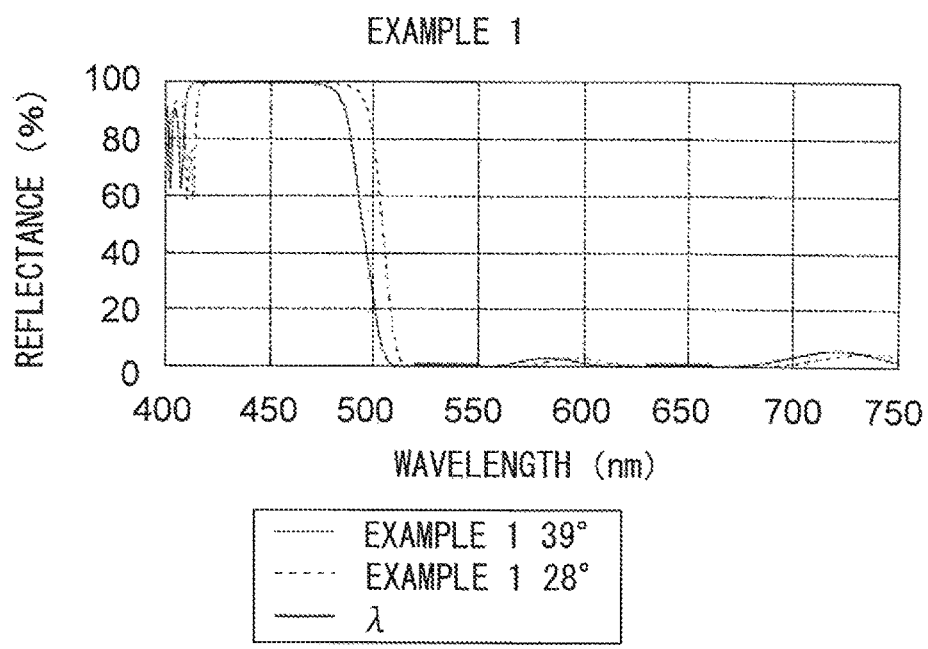
FIG. 6A is a chart for illustrating reflectance of the dichroic film of Example 1 that reflects blue light.
Figure 6B:
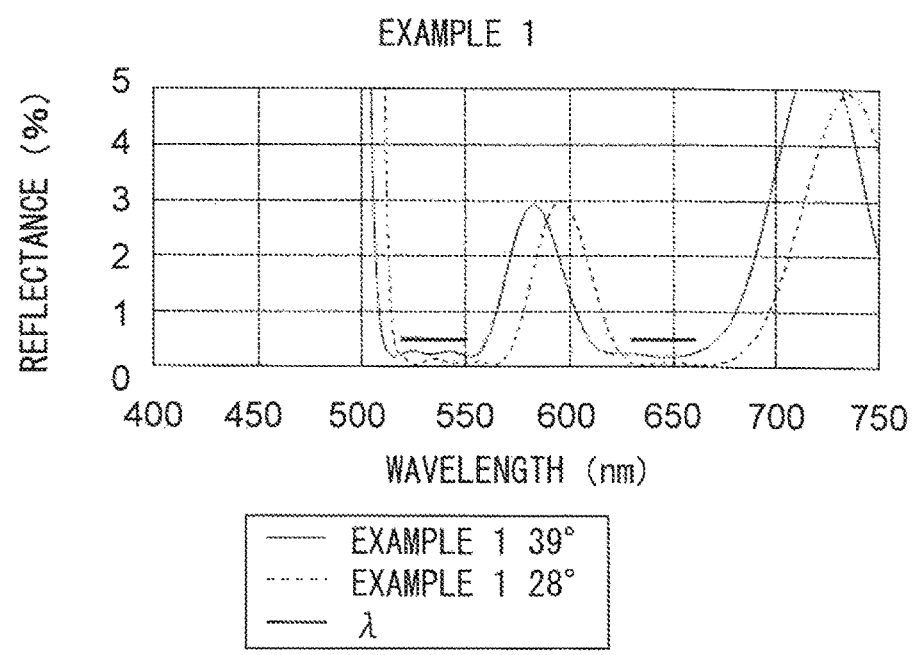
FIG. 6B is a chart for illustrating reflectance of the dichroic film of Example 1 that reflects blue light.

FIGS. 6A, 6B show the result of measurement of reflectance of Example 1 of the BLUE dichro as a dichroic film. In each of FIG. 6A and FIG. 6B, the horizontal axis represents wavelength in a range of 400 to 750 nm, and the vertical axis represents reflectance. Here, the vertical axis of FIG. 6A is marked with values from 0 to 100%, while that of FIG. 6B is marked with values from 0 to 5%; that is, FIG. 6B shows difference in reflectance in an enlarged manner.

In FIG. 6A, the reflectance of the dichroic film of FIG. 3B (with respect to a light ray at the illumination-light angle of incidence of 39° and with respect to a light ray at the projection-light angle of incidence of 28°) appears to be substantially 0% for the range of 520 to 550 nm and for the range of 620 to 660 nm, but the enlarged illustration of FIG. 6B shows that the reflectance varies in the range of 0 to 0.3% for the range of 520 to 550 nm and for the range of 620 to 660 nm, and rises up to approximately 3% for the range of 560 to 620 nm.

For example, when this dichroic film is applied to laser light, substantially 100% of light rays are expected to be reflected in the first wavelength range of 440 to 470 nm light rays within which are to be reflected, a reflectance of approximately 0.3% is expected for the second wavelength range of 520 to 550 nm light rays in which are to be transmitted, and a reflectance of approximately 0.3% is expected also for the third wavelength range of 630 to 660 nm.

The following has become clear: On the dichroic film of Example 1 of the BLUE dichro according to one or more embodiments, the reflectance is high for the range of 560 to 620 nm, but this wavelength range does not fall within the wavelength ranges of the laser light, and thus does not cause any inconvenience, and this dichroic film reduces reflectance to 0.5% or lower with respect to the predetermined second wavelength range of 520 to 550 nm and third wavelength range of 630 to 660 nm.

Example 2 of Blue Dichro: Next, a description will be given of a dichroic film according to one or more embodiments (the dichroic film corresponding to the dichroic film B according to one or more embodiments), with reference to FIG. 3C, FIG. 7A, and FIG. 7B. FIG. 3C shows a configuration of the dichroic film, and FIGS. 7A, 7B show reflectance of the dichroic film.

As shown in FIG. 3C, the dichroic film according to one or more embodiments (Example 2 of the BLUE dichro) is formed by laying on a substrate glass, in the same manner as in the case of the previously described comparative example, odd-numbered layers (layers No. 1, No. 3, ..., No. 29) each formed as a $TiO_2$ film having a refractive index of 2.41. However, it is different from the comparative example in that even-numbered layers (layers No. 2, No. 4, ..., No. 30) are each formed as an $SiO_2$ layer having a refractive index of 1.47.

Furthermore, the layers have thicknesses d (nm) different from those in the comparative example. Used as the substrate glass is the conventionally known BK7 produced by Schott AG, the refractive index of which is 1.52.

Figure 7A:
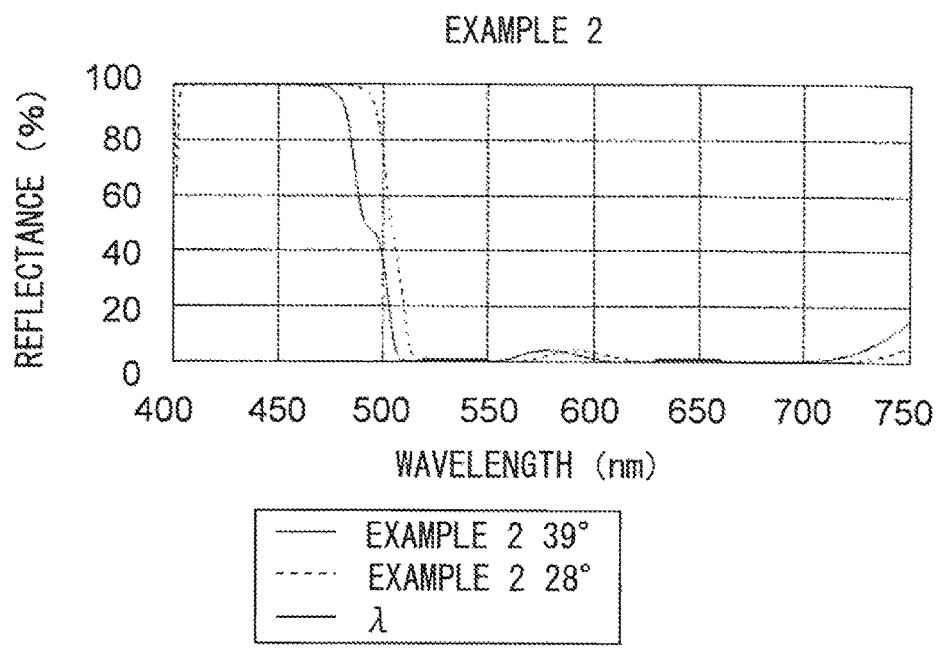
FIG. 7A is a chart for illustrating reflectance of the dichroic film of Example 2 that reflects blue light.
Figure 7B:
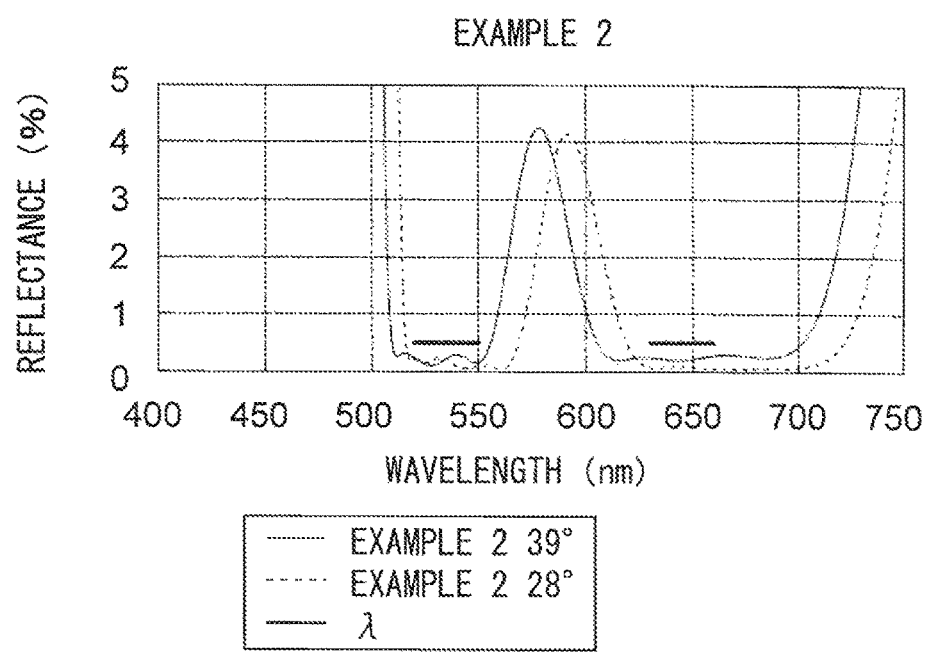
FIG. 7B is a chart for illustrating reflectance of the dichroic film of Example 2 that reflects blue light.

FIGS. 7A, 7B show the result of measurement of reflectance of Example 2 of the BLUE dichro as a dichroic film. In each of FIG. 7A and FIG. 7B, the horizontal axis represents wavelength in a range of 400 to 750 nm, and the vertical axis represents reflectance. Here, the vertical axis of FIG. 7A is marked with values from 0 to 100%, while that of FIG. 7B is marked with values from 0 to 5%; that is, FIG. 7B shows difference in reflectance in an enlarged manner.

In FIG. 7A, the reflectance of the dichroic film of FIG. 3C (with respect to a light ray at the illumination-light angle of incidence of 39° and with respect to a light ray at the projection-light angle of incidence of 28°) appears to be substantially 0% for the range of 520 to 550 nm and for the range of 620 to 700 nm, but the enlarged illustration of FIG. 7B shows that the reflectance varies in the range of 0 to 0.3% for the range of 520 to 550 nm and for the range of 620 to 700 nm, and rises up to approximately 4% for the range of 550 to 620 nm.

For example, when the dichroic film is applied to laser light, a reflectance of approximately 0.3% is expected for the second wavelength range of 520 to 550 nm, and a reflectance of approximately 0.3% is expected also for the third wavelength range of 630 to 660 nm.

That is, the following has become clear: On the dichroic film of Example 2 of the BLUE dichro according to one or more embodiments, the reflectance is high for the range of 550 to 620 nm, but this wavelength range does not fall within the wavelength ranges of the laser light, and thus does not cause any inconvenience, and this dichroic film reduces the reflectances to 0.5% or lower with respect to the predetermined second wavelength range of 520 to 550 nm and third wavelength range of 630 to 660 nm.

Furthermore, it is also clear that the effect of reducing the reflectance is to such an extent that a wavelength-averaged reflectance in the transmission wavelength ranges is 0.5% or lower both at the center angle of incidence of illumination light and at the center angle of incidence of projection light. With this configuration, the reflectance for transmission light is 0.5% or lower when the transmission light passes through the dichroic film, and thus, even with high-power light radiated by the laser light sources, it is possible to reduce reflected light, to thereby improve efficiency of using light.

Example 1 of RED Dichro: Next, a description will be given of a dichroic film according to one or more embodiments (the dichroic film corresponding to the dichroic film R according to one or more embodiments), with reference to FIG. 4B, FIG. 9A, and FIG. 9B. FIG. 4B shows a configuration of the dichroic film, and FIGS. 9A, 9B show reflectance of the dichroic film.

As shown in FIG. 4B, the dichroic film according to one or more embodiments (Example 1 of the RED dichro) is formed by laying the following layers on a substrate glass in the same manner as in the case of the previously described comparative example: odd-numbered layers (layers No. 1, No. 3, ..., No. 25) each formed as an $Al_2O_3$ film having a refractive index of 1.66; even-numbered layers (layers No. 2, No. 4, ..., No. 26) each formed as an $Nb_2O_5$ layer having a refractive index of 2.23; and layer No. 27 formed as an $SiO_2$ layer having a refractive index of 1.47.

However, the layers have thicknesses d (nm) different from those in the comparative example. Used as the substrate glass is the conventionally known BK7 produced by Schott AG, the refractive index of which is 1.52.

Figure 9A:
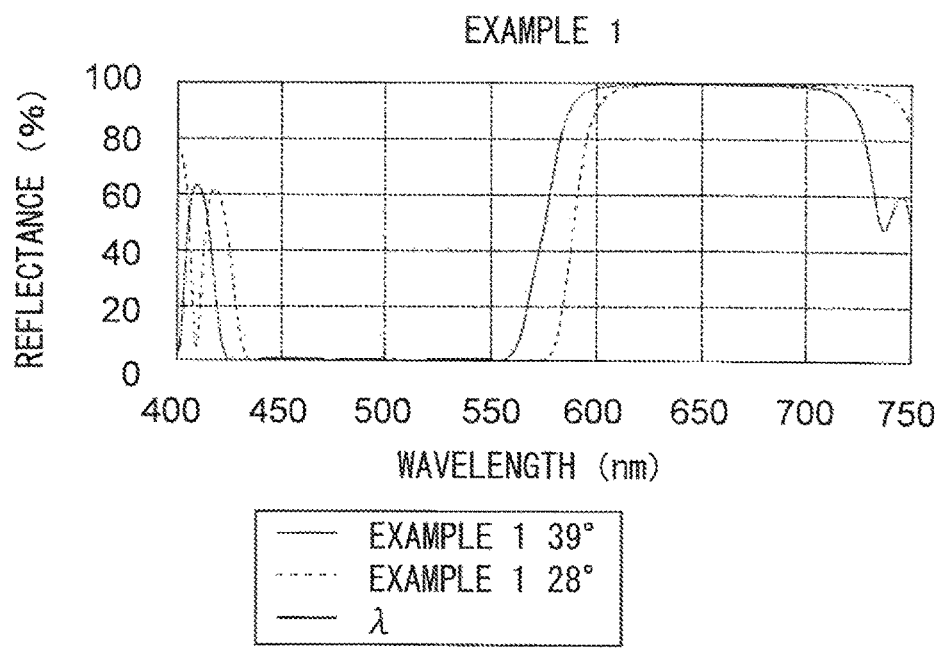
FIG. 9A is a chart for illustrating reflectance of the dichroic film of Example 1 that reflects red light.
Figure 9B:
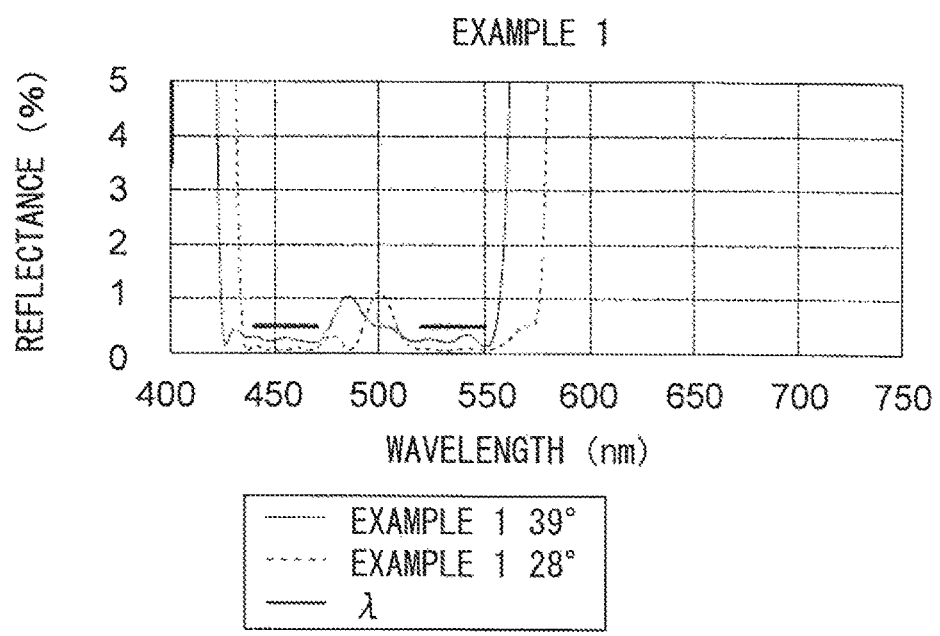
FIG. 9B is a chart for illustrating reflectance of the dichroic film of Example 1 that reflects red light.

FIGS. 9A, 9B show the result of measurement of reflectance of Example 1 of the RED dichro as a dichroic film. In each of FIG. 9A and FIG. 9B, the horizontal axis represents wavelength in a range of 400 to 750 nm, and the vertical axis represents reflectance. Here, the vertical axis of FIG. 9A is marked with values from 0 to 100%, while that of FIG. 9B is marked with values from 0 to 5%; that is, FIG. 9B shows difference in reflectance in an enlarged manner.

In FIG. 9A, the reflectance of the dichroic film of FIG. 4B (with respect to a light ray at the illumination-light angle of incidence of 39° and with respect to a light ray at the projection-light angle of incidence of 28°) appears to be substantially 0% for the range of 440 to 550 nm, but the enlarged illustration of FIG. 9B shows that the reflectance varies in the range of 0 to 0.3% for the range of 430 to 470 nm and for the range of 520 to 550 nm, and rises up to approximately 1% for the range of 470 to 520 nm.

For example, when the dichroic film is applied to laser light, a reflectance of approximately 0.3% is expected for the first wavelength range of 440 to 470 nm, and a reflectance of approximately 0.3% is expected also for the second wavelength range of 520 to 550 nm.

That is, the following has become clear: On the dichroic film of Example 1 of the RED dichro according to one or more embodiments, the reflectance is high for the range of 470 to 520 nm, but this wavelength range is out of the wavelength ranges of the laser light, and thus does not cause any inconvenience, and this dichroic film has a reduces the reflectances to 0.5% or lower with respect to the predetermined first wavelength range of 470 to 520 nm and second wavelength range of 520 to 550 nm.

Example 2 of RED Dichro: Next, a description will be given of a dichroic film according to one or more embodiments (the dichroic film corresponding to the dichroic film R according to one or more embodiments), with reference to FIG. 4C, FIG. 10A, and FIG. 10B. FIG. 4C shows a configuration of the dichroic film, and FIGS. 10A, 10B show reflectance of the dichroic film.

As shown in FIG. 4C, the dichroic film (Example 2 of the RED dichro) according to one or more embodiments is formed by laying, on a substrate glass in the same manner as in the case of the previously described comparative example, even-numbered layers (layers No. 2, No. 4, . . . , No. 26) each formed as a $Nb_2O_5$ film having a refractive index of 2.23, and layer No. 27, which is the outermost layer, formed as a layer of $SiO_2$ having a refractive index of 1.47. However, it is different from the comparative example in that odd-numbered layers (layers No. 1, No. 3, . . . , No. 25) are each formed as an $SiO_2$ layer having a refractive index of 1.47.

Furthermore, the layers have thicknesses d (nm) different from those in the comparative example. Used as the substrate glass is the conventionally known BK7 produced by Schott AG, the refractive index of which is 1.52.

Figure 10A:
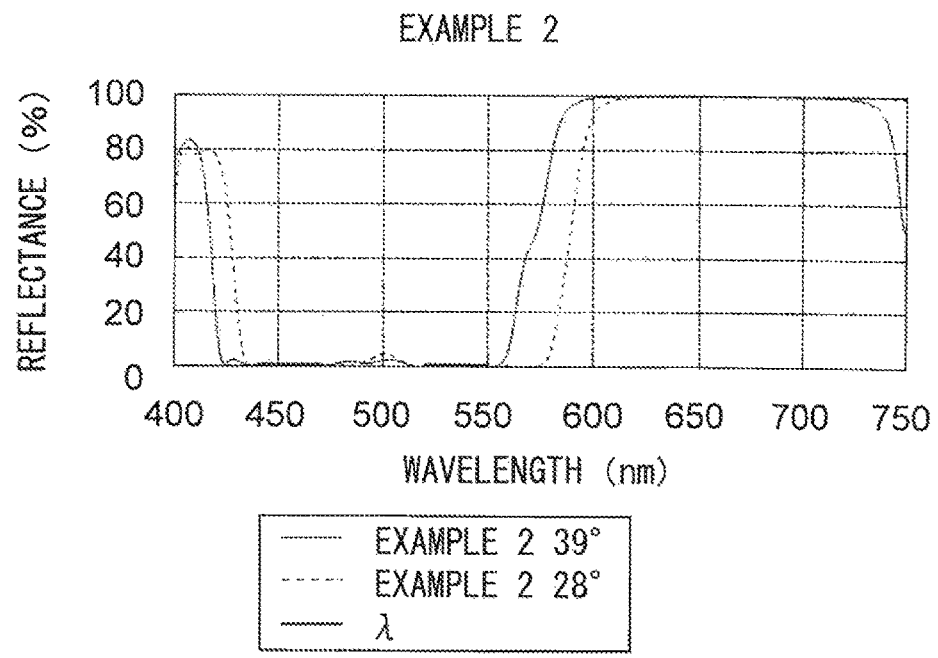
FIG. 10A is a chart for illustrating reflectance of the dichroic film of Example 2 that reflects red light.
Figure 10B:
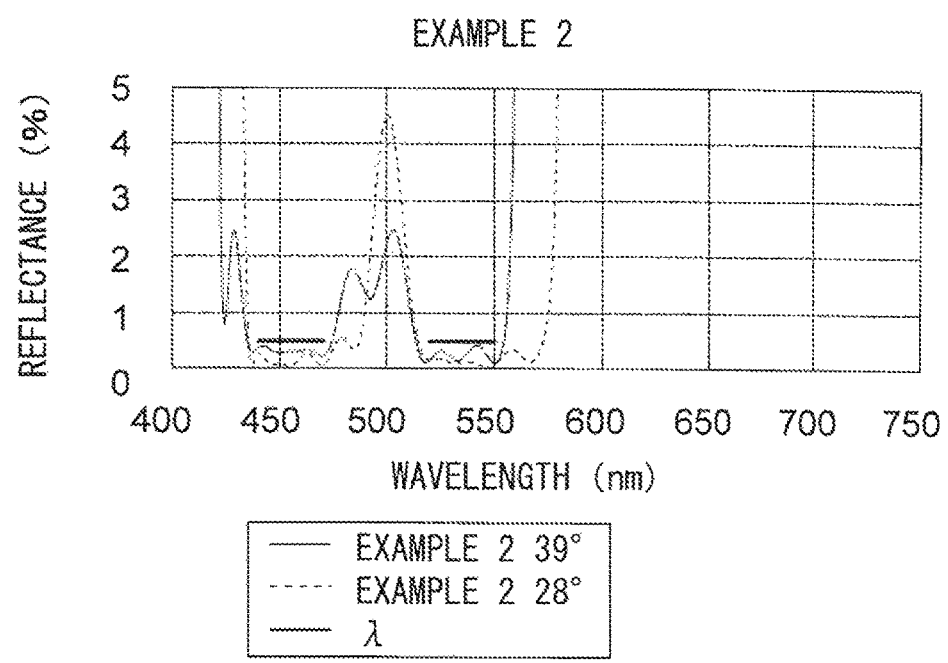
FIG. 10B is a chart for illustrating reflectance of the dichroic film of Example 2 that reflects red light.

FIGS. 10A, 10B show the result of measurement of reflectance of Example 2 of the RED dichro as a dichroic film. In each of FIG. 10A and FIG. 10B, the horizontal axis represents wavelength in a range of 400 to 750 nm, and the vertical axis represents reflectance. Here, the vertical axis of FIG. 10A is marked with values from 0 to 100%, while that of FIG. 10B is marked with values from 0 to 5%; that is, FIG. 10B shows difference in reflectance in an enlarged manner.

In FIG. 10A, the reflectance of the dichroic film of FIG. 4C (with respect to a light ray at the illumination-light angle of incidence of 39° and with respect to a light ray at the projection-light angle of incidence of 28°) appears to be substantially 0% for the range of 440 to 550 nm, but the enlarged illustration of FIG. 10B shows that the reflectance varies in the range of 0 to 0.3% for the range of 440 to 470 nm and for the range of 520 to 550 nm, and rises up to approximately 4% for the range of 470 to 520 nm.

For example, when the dichroic film is applied to laser light, a reflectance of approximately 0.3% is expected for the first wavelength range of 440 to 470 nm, and a reflectance of approximately 0.3% is expected also for the second wavelength range of 520 to 550 nm.

That is, the following has become clear: On the dichroic film of Example 2 of the RED dichro according to one or more embodiments, the reflectance is high for the range of 470 to 520 nm, but this wavelength range is out of the wavelength ranges of the laser light, and thus does not cause any inconvenience, and this dichroic film reduces the reflectances to 0.5% or lower with respect to the predetermined first wavelength range of 440 to 470 nm and second wavelength range of 520 to 550 nm.

As described above, the color separating and combining prism DP according to one or more embodiments is incorporated in a projector including an illumination optical system configured to guide illumination light rays emitted by blue, green, and red laser light sources to the image display devices, and a projection optical system configured to guide projection light rays from the image display devices to a projection lens, and the color separating and combining prism DP has the illumination light separating function and the projection light rays combining function. Furthermore, the color separating and combining prism DP according to one or more embodiments is characterized by having dichroic films each of which reflects light in the first or third wavelength range among the first wavelength range in the blue region, the second wavelength range in the green region, and the third wavelength range in the red region, the dichroic films each transmitting light in the other two adjacent wavelength ranges, and that, at a predetermined angle of incidence, an average reflectance in the other two wavelength ranges light in which is transmitted through the dichroic film is lower than a wavelength-averaged reflectance in a wavelength region sandwiched between the other two wavelength ranges.

For example, in the wavelength range of 520 to 660 nm, which includes the second and third wavelength ranges, Example 1 of the BLUE dichro exhibits a reflectance of approximately 0.3% with respect to the second wavelength range of 520 to 550 nm and the third wavelength range of 630 to 660 nm, but the reflectance rises up to approximately 3% in the wavelength range of 560 to 620 nm. Thus, it can be described that the color separating and combining prism DP has, on a surface that reflects light in the first wavelength range but transmits light in the other two adjacent wavelength ranges, a dichroic film on which, at a predetermined angle of incidence, an average reflectance in the other two wavelength ranges light in which is transmitted through the dichroic film is lower than a wavelength-averaged reflectance in a wavelength region sandwiched between the other two wavelength ranges.

Thus, the dichroic films B, R according to one or more embodiments are effective particularly on the first prism DP1 that must transmit light rays in wavelength ranges of two colors, that is, light rays in the second wavelength range and in the first or third wavelength range. Needless to say, however, this does not mean that the dichroic films B, R according to one or more embodiments are not effective on the second prism DP2.

Table 1 below shows the result of comparison in reflectance between the comparison example, Example 1, and Example 2 of the BLUE dichro, and Table 2 below shows the result of comparison in reflectance between the comparison example, Example 1, and Example 2 of the RED dichro. Reflectance was measured with respect to the illumination light (at the angle of incidence of 39°) and the projection light (at the angle of incidence of 28°).

TABLE 1

| BLUE DICHRO REFLECTANCE COMPARISON | | COMPARATIVE EXAMPLE ILLUMINATION LIGHT | COMPARATIVE EXAMPLE PROJECTION LIGHT | EXAMPLE 1 ILLUMINATION LIGHT | EXAMPLE 1 PROJECTION LIGHT | EXAMPLE 2 ILLUMINATION LIGHT | EXAMPLE 2 PROJECTION LIGHT |
|---|---|---|---|---|---|---|---|
| ANGLE OF INCIDENCE (AIR SIDE) | | 39° | 28° | 39° | 28° | 39° | 28° |
| REFLECTED RANGE | 440-470 nm | 99.85 | 99.97 | 99.91 | 99.97 | 99.94 | 99.99 |
| | 470-520 nm | — | — | — | — | — | — |
| TRANSMITTED RANGE | 520-550 nm | 0.67 | 0.66 | 0.26 | 0.10 | 0.19 | 0.14 |
| | 550-630 nm | 0.49 | 0.41 | 1.22 | 1.18 | 1.67 | 1.63 |
| TRANSMITTED RANGE | 630-660 nm | 0.55 | 0.31 | 0.21 | 0.06 | 0.22 | 0.07 |

TABLE 2

| RED DICHRO REFLECTANCE COMPARISON | | COMPARATIVE EXAMPLE ILLUMINATION LIGHT | COMPARATIVE EXAMPLE PROJECTION LIGHT | EXAMPLE 1 ILLUMINATION LIGHT | EXAMPLE 1 PROJECTION LIGHT | EXAMPLE 2 ILLUMINATION LIGHT | EXAMPLE 2 PROJECTION LIGHT |
|---|---|---|---|---|---|---|---|
| ANGLE OF INCIDENCE (AIR SIDE) | | 39° | 28° | 39° | 28° | 39° | 28° |
| TRANSMITTED RANGE | 440-470 nm | 0.41 | 0.18 | 0.25 | 0.08 | 0.31 | 0.14 |
| | 470-520 nm | 0.37 | 0.22 | 0.55 | 0.43 | 1.29 | 1.59 |
| TRANSMITTED RANGE | 520-550 nm | 0.67 | 0.24 | 0.26 | 0.08 | 0.27 | 0.12 |
| | 550-630 nm | — | — | — | — | — | — |
| REFLECTED RANGE | 630-660 nm | 99.92 | 99.88 | 99.84 | 99.83 | 99.95 | 99.94 |

As shown in Table 1, comparison in reflectance between the examples of the dichroic film that reflects blue light (corresponding to the dichroic film B according to the one or more embodiments) shows that the reflectance (the wavelength-averaged reflectance) of illumination light in the wavelength range of 520 to 550 nm, light in which is transmitted through the dichroic film, is 0.67% in the comparative example, but it is 0.26% and 0.19% in Examples 1 and 2, respectively, and thus Examples 1 and 2 have been proved to be effective in reducing the reflectance. However, for the wavelength range of 550 to 630 nm, which is out of the predetermined wavelength ranges, the reflectance is 0.49 in the comparative example, but it is degraded to 1.22% and 1.67% in Examples 1 and 2, respectively.

This, however, does not cause any inconvenience, because the wavelength band of 550 to 630 nm, which is out of the predetermined wavelength ranges, is also out of the predetermined ranges of the laser light radiated by the laser light sources.

Likewise, the reflectance (the wavelength-averaged reflectance) of the projection light in the wavelength range of 520 to 550 nm, light in which is transmitted through the dichroic film, is 0.66% in the comparative example, but it is 0.10% and 0.14% in Examples 1 and 2, respectively, and thus Examples 1 and 2 have been proved to be effective in reducing reflectance. Also, the reflectance for the illumination light in the transmission range of 630 to 660 nm is 0.55% in the comparative example, but it is 0.21% and 0.22% in Examples 1 and 2, respectively, and the reflectance for the projection light in the transmission range of 630 to 660 nm is 0.31 in the comparative example, but it is 0.06% and 0.07% in Examples 1 and 2, respectively, and thus Examples 1 and 2 have been proved to be effective in reducing the reflectance.

Also, as shown in Table 2 regarding the dichroic film that reflects red light (corresponding to the dichroic film R according to the one or more embodiments), the reflectance (the wavelength-averaged reflectance) of the illumination light in the range of 440 to 470 nm, light in which is transmitted through the dichroic film, is 0.41% in the comparative example, but is 0.25% and 0.31% in Examples 1 and 2, respectively, and the reflectance for the illumination light in the range of 520 to 550 nm, light in which is transmitted through the dichroic film, is 0.67 in the comparative example, but is 0.26% and 0.27% in Examples 1 and 2, respectively, and thus Examples 1 and 2 have been proved to be effective in reducing the reflectance.

As for the projection light, the reflectance for the transmission range of 440 to 470 nm is 0.18% in the comparative example, but is 0.08% and 0.14% in Examples 1 and 2, respectively, and the reflectance for the transmission range of 520 to 550 nm is 0.24% in the comparative example, but is 0.08% and 0.12% in Examples 1 and 2, respectively.

As described above, according to one or more embodiments, in comparison with the conventional example, a sufficiently low reflectance is obtained for the wavelength range of laser light of each color. Thus, it is possible to reduce damage to optical components and adhesives by reflected light, and degradation of images by stray light. Note that it has been found that, as for the angle of incidence, the unnecessarily reflected light reducing effect can be obtained more than with a conventional dichroic film in corresponding wavelength ranges, at angles of incidence in the range of ±10° on both the low angle side (28°) and the high angle side (39°).

Furthermore, it is clear that a reflectance as high as 99.8% or higher is exhibited with respect to each of the reflection wavelength ranges light in which is reflected, such that light in a predetermined wavelength band is securely reflected and other light rays are securely transmitted in each example of one or more embodiments. Thus, the color separating and combining prism DP provided with the dichroic films B, R according to one or more embodiments is a color separating and combining prism that is capable of reducing reflection of light transmitting through prisms to thereby reduce reflected light and improve the efficiency of using light.

Moreover, with an optical system (a projector) employing this color separating and combining prism DP having dichroic films each formed such that an average reflectance in two wavelength ranges light in which is transmitted through the dichroic film is lower than a wavelength-averaged reflectance in a wavelength region sandwiched between the two wavelength ranges, it is possible to reduce the reflection of light passing through prisms to thereby reduce reflected light, and thus to obtain an optical system capable of improving efficiency of using light.

As has been discussed above, according to one or more embodiments, in a projector including an illumination light source that radiates laser light and a color separating and combining prism, it is possible to obtain a light separating and combining prism capable of reducing reflection of light to be transmitted through a prism to thereby improve efficiency of using light even with high-power light radiated by a laser light source, and an optical system (a projector) employing the same.

With the features described herein, the color separating and combining prism according to one or more embodiments and the optical system (the projector) employing the same are suitably applicable to large-sized projectors and the like where it is required to use high-power laser light to display an image on a large screen.

LIST OF REFERENCE SIGNS 1 illumination light source
2 laser light source
IL illumination optical system
PL projection optical system
PR prism for projection optical system
PR1 first prism
PR2 second prism
DP color separating and combining prism
DP1 first prism
DP2 second prism
B dichroic film (BLUE dichro)
R dichroic film (RED dichro)
I illumination light
P projection light Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A color separating and combining prism incorporated in a projector including an illumination optical system that guides illumination light radiated by blue, green, and red laser light sources to an image display device, and a projection optical system that guides projection light from the image display device to a projection lens, wherein
the color separating and combining prism separates illumination light and combines projection light rays,
the color separating and combining prism comprises a dichroic film,
from among a first wavelength range in a blue region, a second wavelength range in a green region, and a third wavelength range in a red region, the dichroic film reflects light in one of the first or third wavelength range, and transmits light in the other two wavelength ranges,
the other two wavelength ranges are adjacent to each other, and
at a predetermined angle of incidence, an average reflectance for all the light transmitted through the dichroic film in the other two wavelength ranges is lower than a wavelength-averaged reflectance for all the light transmitted through the dichroic film in a wavelength region sandwiched between the other two wavelength ranges.

2. The color separating and combining prism according to claim 1, wherein
the wavelength-averaged reflectance for the light transmitted through the dichroic film in the wavelength ranges is 0.5% or lower both at a center angle of incidence of illumination light and at a center angle of incidence of projection light.

3. The color separating and combining prism according to claim 1, wherein
the first wavelength range in the blue region is 440 to 470 nm, the second wavelength range in the green region is 520 to 550 nm, and the third wavelength range in the red region is 630 to 660 nm.

4. The color separating and combining prism according to claim 2, wherein
the first wavelength range in the blue region is 440 to 470 nm, the second wavelength range in the green region is 520 to 550 nm, and the third wavelength range in the red region is 630 to 660 nm.

5. The color separating and combining prism according to claim 4, wherein
a peak value of reflectance for the light transmitted through the dichroic film is 3% or larger in a wavelength range of 470 to 520 nm which is adjacent to the first wavelength range of 440 to 470 nm and the second wavelength range of 520 to 550 nm.

6. The color separating and combining prism according to claim 4, wherein
a peak value of reflectance for the light transmitted through the dichroic film is 3% or larger in a wavelength range of 560 to 620 nm which is adjacent to the second wavelength range of 520 to 550 nm and the third wavelength range of 630 to 660 nm.

7. The color separating and combining prism according to claim 5, wherein
a peak value of reflectance for the light transmitted through the dichroic film is 3% or larger in a wavelength range of 560 to 620 nm which is adjacent to the second wavelength range of 520 to 550 nm and the third wavelength range of 630 to 660 nm.

8. The color separating and combining prism according to claim 4, wherein
a peak value of reflectance for the light transmitted through the dichroic film is 3% or larger in a wavelength range of 700 to 750 nm which is adjacent to the third wavelength range of 630 to 660 nm.

9. The color separating and combining prism according to claim 5, wherein
a peak value of reflectance for the light transmitted through the dichroic film is 3% or larger in a wavelength range of 700 to 750 nm which is adjacent to the third wavelength range of 630 to 660 nm.

10. The color separating and combining prism according to claim 6, wherein a peak value of reflectance for the light transmitted through the dichroic film is 3% or larger in a wavelength range of 700 to 750 nm which is adjacent to the third wavelength range of 630 to 660 nm.

11. The color separating and combining prism according to claim 7, wherein
a peak value of reflectance for the light transmitted through the dichroic film is 3% or larger in a wavelength range of 700 to 750 nm which is adjacent to the third wavelength range of 630 to 660 nm.

12. A projector comprising:
a laser light source that emits blue illumination light, green illumination light, and red illumination light;
an image display device;
an illumination optical system that guides illumination light to the image display device;
a color separating and combining prism that separates illumination light and combines projection light rays;
a projection lens; and
a projection optical system that guides projection light from the image display device to the projection lens, wherein
the color separating and combining prism comprises a dichroic film, wherein
from among a first wavelength range in a blue region, a second wavelength range in a green region, and a third wavelength range in a red region, the dichroic film reflects light in one of the first or third wavelength range, and transmits light in the other two wavelength ranges,
the other two wavelength ranges are adjacent to each other, and
at a predetermined angle of incidence, an average reflectance for all light transmitted through the dichroic film in the other two wavelength ranges is lower than a wavelength-averaged reflectance for all the light transmitted through the dichroic film in a wavelength region sandwiched between the two wavelength ranges.

13. The projector according to claim 12, wherein
the first wavelength range is 440 to 470 nm and the second wavelength range is 520 to 550 nm, and
a peak value of reflectance for the light transmitted through the dichroic film is 3% or larger in a wavelength range of 470 to 520 nm which is adjacent to the first wavelength range and the second wavelength range.

14. The projector according to claim 12, wherein
the second wavelength range is 520 to 550 nm and the third wavelength range is 630 to 660 nm, and
a peak value of reflectance for the light transmitted through the dichroic film is 3% or larger in a wavelength range of 560 to 620 nm which is adjacent to the second wavelength range and the third wavelength range.

* * * * *